(12) United States Patent
Rofougaran

(10) Patent No.: US 8,233,935 B2
(45) Date of Patent: Jul. 31, 2012

(54) METHOD AND SYSTEM FOR SHARING RF FILTERS IN SYSTEMS SUPPORTING WCDMA AND GSM

(75) Inventor: Ahmadreza Rofougaran, Marina Del Rey, CA (US)

(73) Assignee: Broadcom Corporation, Irvine, CA (US)

( * ) Notice: Subject to any disclaimer, the term of this patent is extended or adjusted under 35 U.S.C. 154(b) by 778 days.

(21) Appl. No.: 11/536,669

(22) Filed: Sep. 29, 2006

(65) Prior Publication Data

US 2008/0080453 A1 Apr. 3, 2008

(51) Int. Cl.
H04M 1/00 (2006.01)
H04B 1/44 (2006.01)
H04B 1/40 (2006.01)

(52) U.S. Cl. ........... 455/552.1; 455/78; 455/83; 455/84; 455/553.1

(58) Field of Classification Search ............... 370/331, 370/310; 455/78, 83, 84, 552.1, 553.1
See application file for complete search history.

(56) References Cited

U.S. PATENT DOCUMENTS

| | | | |
|---|---|---|---|
| 5,963,854 A | 10/1999 | Andreasson | |
| 6,393,299 B1* | 5/2002 | Mizumoto et al. | 455/552.1 |
| 6,456,172 B1 | 9/2002 | Ishizaki | |
| 6,708,044 B1* | 3/2004 | Puknat et al. | 455/552.1 |
| 6,741,847 B1 | 5/2004 | Claxton | |
| 6,917,815 B2 | 7/2005 | Hajimiri | |
| 7,110,433 B2 | 9/2006 | Feher | |
| 7,260,424 B2 | 8/2007 | Schmidt | |
| 2002/0090974 A1 | 7/2002 | Hagn | |
| 2002/0132597 A1 | 9/2002 | Peterzell | |
| 2002/0140520 A1 | 10/2002 | Hikita | |
| 2003/0021367 A1 | 1/2003 | Smith | |
| 2003/0193923 A1* | 10/2003 | Abdelgany et al. | 370/342 |
| 2003/0193997 A1 | 10/2003 | Dent | |
| 2004/0131014 A1* | 7/2004 | Thompson et al. | 370/230 |
| 2004/0196934 A1 | 10/2004 | Petrov | |
| 2004/0259594 A1 | 12/2004 | Choi | |
| 2005/0032548 A1 | 2/2005 | Frank | |
| 2005/0245201 A1 | 11/2005 | Ella | |
| 2005/0266811 A1 | 12/2005 | Weiss | |
| 2005/0270216 A1 | 12/2005 | Jiang | |
| 2006/0056355 A1 | 3/2006 | Love | |
| 2007/0030116 A1 | 2/2007 | Feher | |
| 2007/0032238 A1 | 2/2007 | Kim | |
| 2007/0032246 A1 | 2/2007 | Feher | |
| 2007/0032266 A1 | 2/2007 | Feher | |
| 2007/0066245 A1 | 3/2007 | Snider | |
| 2007/0099580 A1 | 5/2007 | Hosokawa | |
| 2007/0155344 A1 | 7/2007 | Wiessner | |
| 2009/0093270 A1 | 4/2009 | Block | |

FOREIGN PATENT DOCUMENTS

| | | |
|---|---|---|
| KR | 20010078104 | 8/2001 |
| KR | 20030006051 | 1/2003 |
| WO | WO 2006/029082 | 3/2006 |

* cited by examiner

*Primary Examiner* — Matthew Sams
(74) *Attorney, Agent, or Firm* — Farjami & Farjami LLP

(57) ABSTRACT

Aspects of a method and system for sharing RF filters in systems supporting WCDMA and GSM are provided. A receiver in a wireless device enables receiving WCDMA signals and GSM signals. The WCDMA signals may be received via at least one duplexer within the wireless device. A processing path for the received WCDMA signals or a processing path for the received GSM signals may be selected within the receiver. The processing paths may share bandpass filtering and signal amplification. A gain in the shared signal amplification may be adjusted after filtering the received signals. For received WCDMA signals, the gain adjustment may be based on a gain provided to the received WCDMA signals before applying the shared bandpass filtering. At least one signal may be generated for selecting the processing path and/or for adjusting the shared signal amplification gain.

30 Claims, 7 Drawing Sheets

METHOD AND SYSTEM FOR SHARING RF FILTERS IN SYSTEMS SUPPORTING WCDMA AND GSM

CROSS-REFERENCE TO RELATED APPLICATIONS/INCORPORATION BY REFERENCE

This application makes reference to:
U.S. application Ser. No. 11/536,678, filed on Sep. 29, 2006;
U.S. application Ser. No. 11/536 682, filed on Sep. 29, 2006;
U.S. application Ser. No. 11/536,650, filed on Sep. 29, 2006;
U.S. application Ser. No. 11/536,644, filed on Sep. 29, 2006;
U.S. application Ser. No. 11/536,676, filed on Sep. 29, 2006;
U.S. application Ser. No. 11/536,659, filed on Sep. 29, 2006;
U.S. application Ser. No. 11/536,673, filed on Sep. 29, 2006;
U.S. application Ser. No. 11/536,679, filed on Sep. 29, 2006;
U.S. application Ser. No. 11/536,670, filed on Sep. 29, 2006;
U.S. application Ser. No. 11/536,672, filed on Sep. 29, 2006;
U.S. application Ser. No. 11/536,648, filed on Sep. 29, 2006;
U.S. application Ser. No. 11/536,666, filed on Sep. 29, 2006;
U.S. application Ser. No. 11/536,675, filed on Sep. 29, 2006;
U.S. application Ser. No. 11/536,685, filed on Sep. 29, 2006;
U.S. application Ser. No. 11/536,645, filed on Sep. 29, 2006;
U.S. application Ser. No. 11/536,655, filed on Sep. 29, 2006;
U.S. application Ser. No. 11/536,660, filed on Sep. 29, 2006;
U.S. application Ser. No. 11/536 657, filed on Sep. 29, 2006;
U.S. application Ser. No. 11/536,662, filed on Sep. 29, 2006
U.S. application Ser. No. 11/536,688, filed on Sep. 29, 2006;
U.S. application Ser. No. 11/536,667, filed on Sep. 29, 2006;
U.S. application Ser. No. 11/536,651, filed on Sep. 29, 2006;
U.S. application Ser. No. 11/536,656, filed on Sep. 29, 2006; and
U.S. application Ser. No. 11/536,663, filed on Sep. 29, 2006.

The above stated applications are hereby incorporated herein by reference in their entirety.

FIELD OF THE INVENTION

Certain embodiments of the invention relate to handling of wireless signals. More specifically, certain embodiments of the invention relate to a method and system for sharing RF filters in systems supporting WCDMA and GSM.

BACKGROUND OF THE INVENTION

Mobile communications has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the data connections, such as the mobile Internet, for example, is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

The evolution of WCDMA technology has resulted in the development of various wireless communication technologies, including General Packet Radio Service (GPRS), Enhanced Data rates for GSM (Global System for Mobile communications) Evolution (EDGE), Universal Mobile Telecommunications System (UMTS), High Speed Downlink Packet Access (HSDPA), and High Speed Uplink Packet Access (HSUDPA), for example. In this regard, the GPRS and EDGE technologies may be utilized for enhancing the data throughput of present second generation (2G) systems such as GSM. The UMTS wireless communication technology is an adaptation of the WCDMA 3G system by GSM. The HSDPA wireless communication technology is an Internet protocol (IP) based service, oriented for data communications, which adapts WCDMA to support data transfer rates on the order of 10 megabits per second (Mbits/s).

In some instances, a single wireless device, such a mobile phone or a personal digital assistant (PDA), for example, may enable support for a plurality of these wireless communication technologies. Enabling support to more than one wireless communication technology within a single wireless device may be expensive and/or may utilize more power, particularly in regards to the implementation and operation of the radio frequency (RF) front-end portion of the wireless device. Simplification of RF front-end designs to support multiple wireless communication technologies may not only provide a cost reduction solution but may in some instances improve the overall power consumption performance of the wireless device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for sharing RF filters in systems supporting WCDMA and GSM, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for sharing RF filters in systems supporting WCDMA and GSM. Aspects of the invention may comprise a receiver in a wireless device that enables receiving HSDPA, HSUDPA, and/or WCDMA signals and GPRS, EDGE, and/or GSM signals. The HSDPA, HSUDPA, and/or WCDMA signals may be received via at least one duplexer within the wireless device. A processing path for the received HSDPA, HSUDPA, and/or WCDMA signals or a processing path for the received GPRS, EDGE, and/or GSM signals may be selected within the receiver. The processing paths may share bandpass filtering and signal amplification. In this regard, common bandpass filtering and signal amplification logic, circuitry and/or code may be utilized to process the received HSDPA, HSUDPA, and/or WCDMA signals and the received GPRS, EDGE, and/or GSM signals A gain in the shared signal amplification may be adjusted after filtering the received signals. For received HSDPA, HSUDPA, and/or WCDMA signals, the gain adjustment may be based on a gain provided to the received HSDPA, HSUDPA, and/or WCDMA signals before applying the shared bandpass filtering. At least one signal may be generated for selecting the processing path and/or for adjusting the shared signal amplification gain.

Aspects of the invention may relate to the integration of WCDMA with EDGE in a wireless device. In GSM and GPRS technologies, there may not be a need for a duplexer during transmission because signals are time division multiplexed, while a switch may be needed to switch between transmit and receive operations, for example. However, for receiving operations, RF bandpass filtering may be required for GSM and GPRS applications. In this regard, there may be a plurality of transmit and/or receive paths or chains implemented within a wireless transceiver in the wireless device. In some instances, filtering may not be necessary on the transmit paths utilized in GSM or GPRS applications due to time duplexing, for example. However, on the receive paths for GSM or GPRS applications, there may be a duplexer for blocking a blocker signal that results from the transmit operations. By integrating the operations of the duplexer and the bandpass filter together, component count and thus, power consumption may be minimized.

Figure 1:
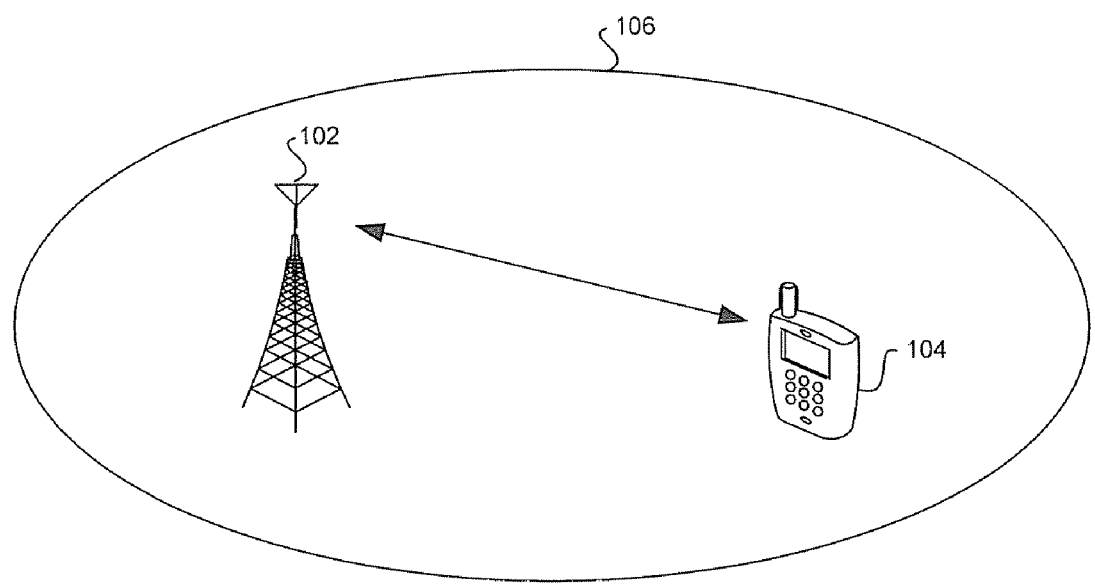
FIG. 1 is a diagram illustrating an exemplary wireless communication system, in connection with an embodiment of the invention.

FIG. 1 is a diagram illustrating an exemplary wireless communication system, in connection with an embodiment of the invention. Referring to FIG. 1, there is shown an antenna 102 and a wireless device 104. The antenna 102 may comprise suitable logic, circuitry, and/or code that may enable wireless communication of voice and/or data with the wireless device 104. The antenna 102 may communicate with the wireless device 104 over at least one of a plurality of wireless communication technologies that may comprise cellular communication technologies, for example. The antenna 102 may provide a coverage area 106 over which the wireless device 104 may communicate with the antenna 102. The antenna 102 may be communicatively coupled to at least one of a plurality of communication networks, such as cellular networks, for example, that enable communication between the wireless device 104 and other devices communicatively coupled to the corresponding communication network.

The wireless device 104 may comprise suitable logic, circuitry, and/or code that may enable wireless communication of voice and/or data with the antenna 102. The wireless device 104 may enable communication over a plurality of wireless communication technologies that may comprise cellular technologies. For example, the wireless device 104 may support WCDMA/EDGE (WEDGE) technologies. In another example, the wireless device 104 may support HSDPA/WCDMA/EDGE (HEDGE) technologies. Notwithstanding, aspects of the invention need not be limited to these exemplary combinations of wireless communication technologies supported by the wireless device 104. For example, the wireless device 104 may support HSDPA, HSUDPA, WCDMA, GPRS, EDGE, and/or GSM wireless communication technologies or wireless protocols.

Figure 2:
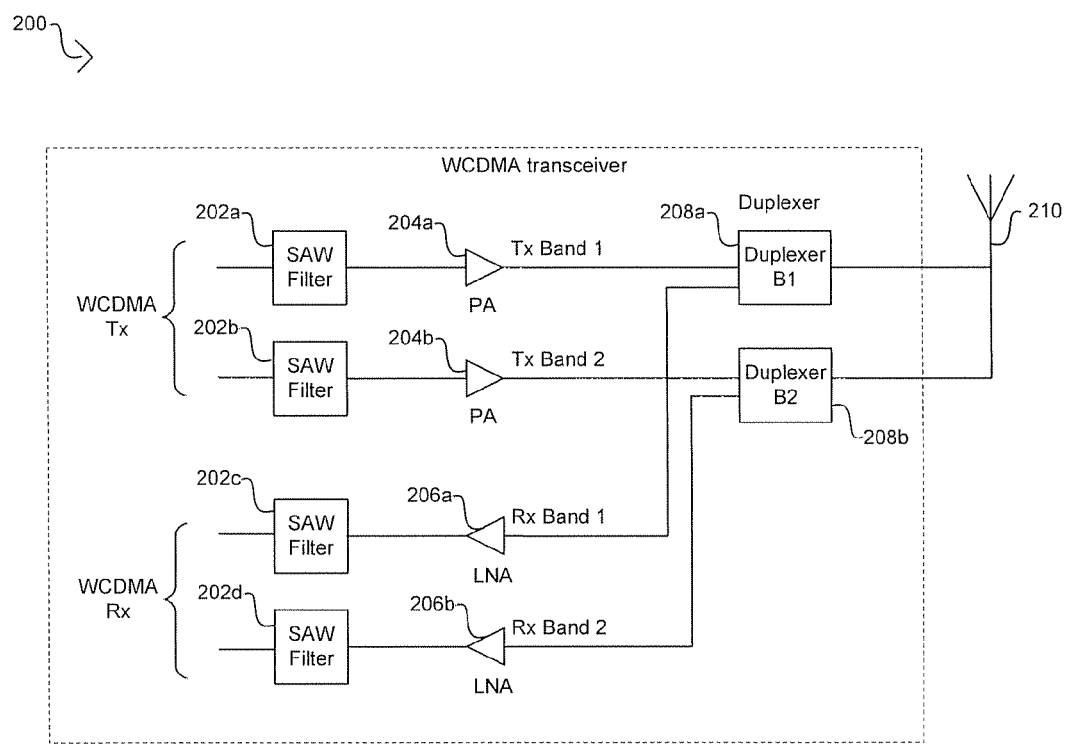
FIG. 2 is a block diagram illustrating an exemplary WCDMA transceiver comprising duplexers for each communication band, in accordance with an embodiment of the invention.

FIG. 2 is a block diagram illustrating an exemplary WCDMA transceiver comprising duplexers for each communication band, in accordance with an embodiment of the invention. Referring to FIG. 2, there is shown a WCDMA transceiver 200 that may be comprised within the wireless device 104 in FIG. 1, for example. The WCDMA transceiver 200 may comprise suitable logic, circuitry, and/or code that may enable communication between the wireless device 104 and the antenna 102, for example. In this regard, the WCDMA transceiver 200 may be communicatively coupled to an antenna 210 that enables wireless communication with the antenna 102.

As shown, the WCDMA transceiver 200 may utilize two (2) communication bands, band 1 and band 2, although aspects of the invention need not be so limited. The transmit paths of the WCDMA transceiver 200 may comprise path surface acoustic wave (SAW) filters 202a and 202b and power amplifiers (PAs) 204a and 204b. The receive paths of the WCDMA transceiver 200 may comprise SAW filters 202c and 202d and low-noise amplifiers (LNAs) 206a and 206b. The WCDMA transceiver 200 may also comprise duplexers 208a (B1) associated with band 1 and 208b (B2) associated with band 2.

The duplexers 208a and 208b may comprise suitable logic, circuitry, and/or code that may enable combination of two or more signals onto a common channel or medium to increase its transmission efficiency. The duplexers 208a and 208b enable isolation between the receive paths or receiver portion of the WCDMA transceiver 200 and the transmit paths or transmitter portion of the WCDMA transceiver 200 while allowing for both paths or portions to share a common antenna. The duplexers 208a and 208b may enable operation in the appropriate frequency band utilized by the receiver portion and the transmitter portion and may be capable of handling the output power produced by the PAs 204a and 204b. Moreover, the duplexers 208a and 208b may enable adequate rejection of transmitter noise at the receive frequencies and may need to provide sufficient isolation to prevent receiver desensitization. In the exemplary embodiment of the invention disclosed in FIG. 2, the duplexer 208a may be associated with handling transmit and receive signals in band 1 while the duplexer 208b may be associated with handling transmit and receive signals in band 2. The operations provided by the duplexers 208a and 208b may also be provided by other devices, such as diplexers or combiners, for example.

The SAW filters 202a and 202b may comprise suitable logic, circuitry, and/or code that may enable filtering signals before amplification via the PAs 204a and 204b, respectively, and transmission via the antenna 210. The SAW filters 202c and 202d may comprise suitable logic, circuitry, and/or code that may enable filtering signals received via the antenna 210 after amplification via the LNAs 206a and 206b, respectively. The PAs 204a and 204b may comprise suitable logic, circuitry, and/or code that may enable sufficient amplification of signals for transmission via the antenna 210. The LNAs 206a and 206b may comprise suitable logic, circuitry, and/or code that may enable sufficient amplification of received signals prior to filtering by the SAW filters 202c and 202d.

In operation, band 1 transmit signals (Tx Band 1) and band 2 transmit signals (Tx Band 2) may be received from another portion of the WCDMA transceiver 200 or from another portion of the wireless receiver 104 and may be filtered by utilizing the SAW filters 202a and 202b respectively. Moreover, the filtered signals may be amplified by utilizing the PAs 204a and 204b respectively. The amplified transmit signals may be communicated to the duplexers 208a and 208b for transmission via the antenna 210.

Band 1 receive signals (Rx Band 1) and band 2 receive signals (Rx Band 2) may be received via the antenna 210 and may be communicated to the duplexers 208a and 208b respectively. The duplexers 208a and 208b may communicate the receive signals Rx Band 1 and Rx Band 2 to the LNAs 206a and 206b for amplification. After amplification, the receive signals may be communicated to the SAW filters 202c and 202d for filtering and the filtered signals may later be communicated to another portion of the WCDMA transceiver 200 or to another portion of the wireless receiver 104 for further processing.

Notwithstanding, the WCDMA transceiver 200 disclosed in FIG. 2 may also support transmission and/or reception of other wireless protocols such as HSDPA and/or HSUDPA, for example, in the same manner or substantially the same manner as for WCDMA wireless protocol signals.

Figure 3:
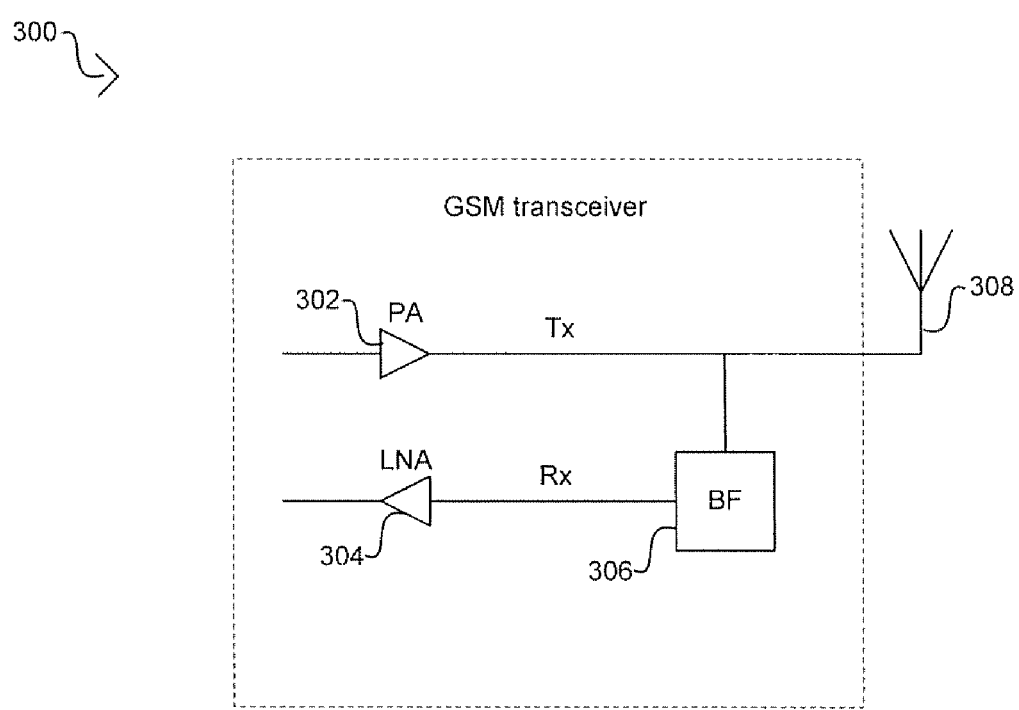
FIG. 3 is a block diagram illustrating an exemplary GSM transceiver comprising a bandpass filter in the receiving path, in accordance with an embodiment of the invention.

FIG. 3 is a block diagram illustrating an exemplary GSM transceiver comprising a bandpass filter in the receiving path, in accordance with an embodiment of the invention. Referring to FIG. 3, there is shown a GSM transceiver 300 that may be comprised within the wireless device 104 in FIG. 1, for example. The GSM transceiver 300 may comprise suitable logic, circuitry, and/or code that may enable communication between the wireless device 104 and the antenna 102, for example. In this regard, the GSM transceiver 300 may be communicatively coupled to an antenna 308 that enables wireless communication with the antenna 102.

As shown, the GSM transceiver 300 may utilize one communication band, although aspects of the invention need not be so limited. The transmit path of the GSM transceiver 300 may comprise a power amplifier (PA) 302. The receive path of the GSM transceiver 300 may comprise a bandpass filter 306 and a low-noise amplifier (LNA) 304. The bandpass filter 306 may comprise suitable logic, circuitry, and/or code that may enable filtering signals received via the antenna 308. The PA 302 may comprise suitable logic, circuitry, and/or code that may enable sufficient amplification of transmit signals (Tx) via the antenna 308. The LNA 304 may comprise suitable logic, circuitry, and/or code that may enable sufficient amplification of received filtered signals from the bandpass filter 306.

In operation, transmit signals (Tx) may be received from another portion of the GSM transceiver 300 or from another portion of the wireless receiver 104 and may be amplified by utilizing the PA 302. The amplified transmit signals may be communicated to the antenna 308 for transmission. The receive signals (Rx) may be received by the antenna 308 and may be communicated to the bandpass filter 306 for filtering. The bandpass filter 306 may communicate the filtered received signals to the LNA 304 for amplification. The amplified signals may be communicated to another portion of the GSM transceiver 300 or to another portion of the wireless receiver 104 for further processing.

Notwithstanding, the GSM transceiver 300 disclosed in FIG. 3 may also support transmission and/or reception of other wireless protocols such as GPRS and/or EDGE, for example, in the same manner or substantially the same manner as for GSM wireless protocol signals.

Figure 4:
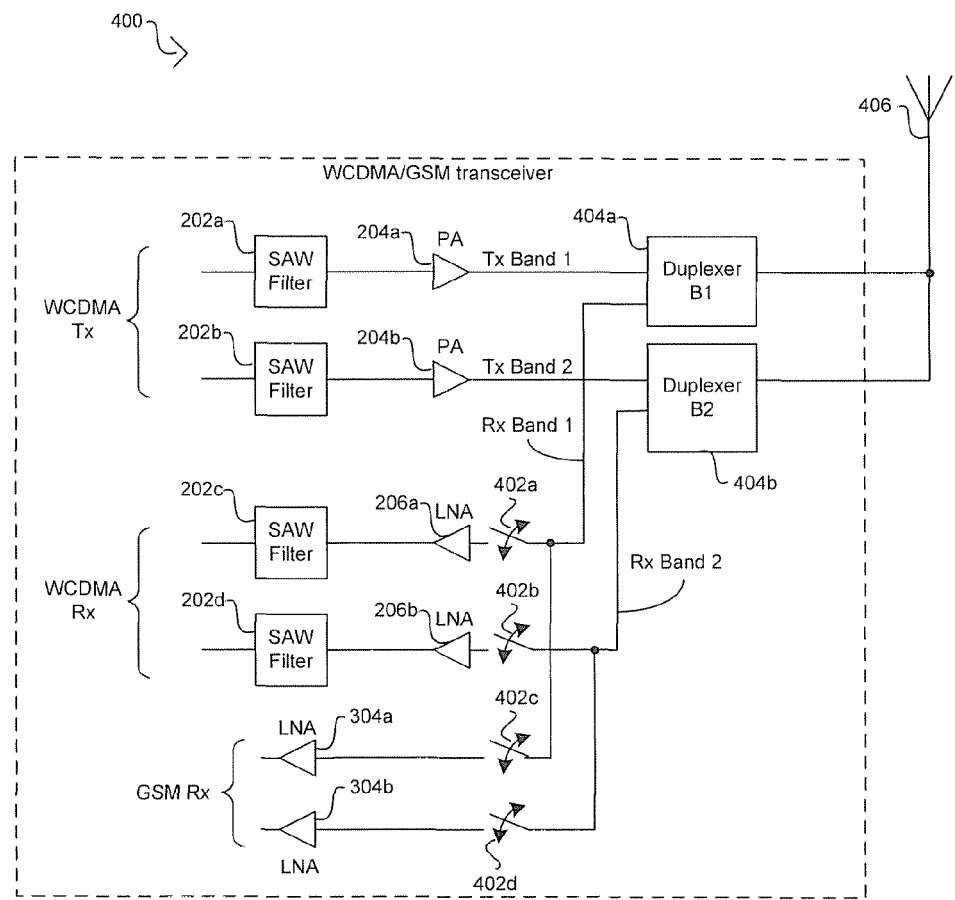
FIG. 4 is a block diagram illustrating an exemplary WCDMA/GSM transceiver, in accordance with an embodiment of the invention.

FIG. 4 is a block diagram illustrating an exemplary WCDMA/GSM transceiver, in accordance with an embodiment of the invention. Referring to FIG. 4, there is shown a WCDMA/GSM transceiver 400 that may be comprised within the wireless device 104 in FIG. 1, for example. The WCDMA/GSM transceiver 400 may comprise suitable logic, circuitry, and/or code that may enable communication between the wireless device 104 and the antenna 102, for example. In this regard, the WCDMA/GSM transceiver 400 may be communicatively coupled to an antenna 406 that enables wireless communication with the antenna 102.

As shown, the WCDMA/GSM transceiver 400 may utilize two (2) communication bands, band 1 and band 2, although aspects of the invention need not be so limited The transmit paths for the WCDMA portion of the WCDMA/GSM transceiver 400 may comprise path SAW filters 202a and 202b, and PAs 204a and 204b as disclosed in FIG. 2. The receive paths for the WCDMA portion of the WCDMA/GSM transceiver 400 may comprise SAW filters 202c and 202d, LNAs 206a and 206b, as disclosed in FIG. 2, and switches 402a and 402b. The receive paths for the GSM portion of the WCDMA/ GSM transceiver 400 may comprise LNAs 304a and 304b, and switches 402c and 402d. The LNAs 304a and 304b may be the same or substantially similar to the LNA 304 disclosed in FIG. 4. The switches 402a and 402b may comprise suitable logic, circuitry, and/or code that may enable selecting a processing path that comprises the receive paths for the WCDMA portion of the WCDMA/GSM transceiver 400 when the received signals are WCDMA signals. The switches 402c and 402d may enable selecting a processing path that comprises the receive paths for the GSM portion of the WCDMA/GSM transceiver 400 when the received signals are GSM signals.

The WCDMA/GSM transceiver 400 may also comprise duplexers 404a (B1) associated with band 1 and 404b (B2) associated with band 2. The duplexers 404a and 404b may comprise suitable logic, circuitry, and/or code that enable combination of two or more signals onto a common channel or medium to increase its transmission efficiency. The duplexers 404a and 404b may be substantially similar to the duplexers 208a and 208b disclosed in FIG. 2. However, the duplexers 404a and 404b may also enable providing bandpass filtering for received GSM signals. In this regard, when GSM signals are received, the operations provided by the duplexers 404a and 404b may also comprise bandpass filtering of the received GSM signals Enabling bandpass filtering of received GSM signals in the duplexers 404a and 404b may enable the WCDMA/GSM transceiver 400 to provide substantially similar operations as the WCDMA transceiver 200 and the GSM transceiver 300 with a reduced number of system elements or components. The operations provided by the duplexers 404a and 404b may also be provided by other devices, such as diplexers or combiners, for example.

Notwithstanding, the WCDMA/GSM transceiver 400 disclosed in FIG. 4 may also support transmission and/or reception of other wireless protocols such as GPRS and/or EDGE, for example, in the same manner or substantially the same manner as for GSM wireless protocol signals. Moreover, the WCDMA/GSM transceiver 400 may also support transmission and/or reception of other wireless protocols such as HSDPA and/or HSUDPA, for example, in the same manner or substantially the same manner as for WCDMA wireless protocol signals.

Figure 5:
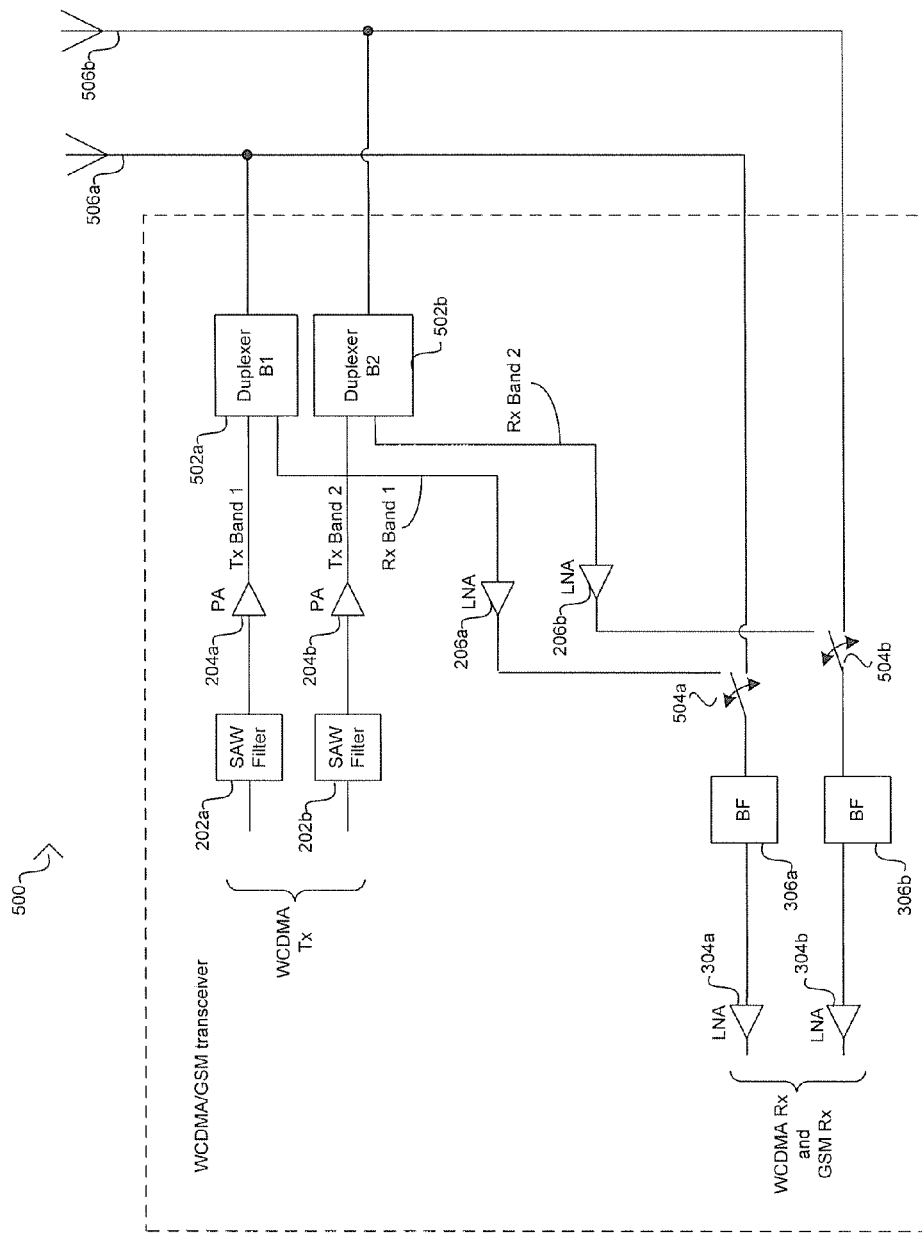
FIG. 5 is a block diagram illustrating an exemplary WCDMA/GSM transceiver with shared bandpass filters, in accordance with an embodiment of the invention.

FIG. 5 is a block diagram illustrating an exemplary WCDMA/GSM transceiver with shared bandpass filters, in accordance with an embodiment of the invention. Referring to FIG. 5, there is shown a WCDMA/GSM transceiver 500 that may be integrated within the wireless device 104 in FIG. 1, for example. The WCDMA/GSM transceiver 500 may comprise suitable logic, circuitry, and/or code that may enable communication between the wireless device 104 and the antenna 102, for example. In this regard, the WCDMA/GSM transceiver 500 may be communicatively coupled to at least one antenna, such as antennas 506*a* and 506*b*, for example, that enable wireless communication with the antenna 102. Although a WCDMA/SGM transceiver 500 is shown, the invention is not limited in this regard. Accordingly, separate transmitter and receiver circuitry may be utilized.

As shown, the WCDMA/GSM transceiver 500 may utilize two (2) communication bands, band 1 and band 2, although aspects of the invention need not be so limited. The transmit paths for the WCDMA portion of the WCDMA/GSM transceiver 500 may comprise path SAW filters 202*a* and 202*b*, and PAs 204*a* and 204*b* as disclosed in FIG. 2. The receive paths for the WCDMA portion of the WCDMA/GSM transceiver 500 may comprise LNAs 206*a* and 206*b*, switches 504*a* and 504*b*, bandpass filters (BFs) 306*a* and 306*b*, and LNAs 304*a* and 304*b*. The LNAs 206*a* and 206*b* may be as disclosed in FIG. 2. The BFs 306*a* and 306*b* may be the same or substantially similar to the BF 306 disclosed in FIG. 3 while the LNAs 304*a* and 304*b* may be the same or substantially similar to the LNA 304 also disclosed in FIG. 3. The LNAs 304*a* and 304*b* may also enable dynamic adjusting of the signal amplification gain provided by the LNAs, for example. In this regard, the WCDMA/GSM transceiver 500 may receive and/or may generate at least one signal to adjust the gain of the LNAs 304*a* and 304*b*.

The receive paths for the GSM portion of the WCDMA/GSM transceiver 500 may comprise the LNAs 304*a* and 304*b*, the BFs 306*a* and 306*b*, and the switches 504*a* and 504*b*. In this regard, the receive paths for processing GSM received signals and the receive paths for processing WCDMA receive signals may share the operations of the switches 504*a* and 504*b*, the BFs 306*a* and 306*b*, and the LNAs 304*a* and 304*b*. The switches 504*a* and 504*b* may comprise suitable logic, circuitry, and/or code that may enable selecting between the processing or receive path for processing the WCDMA received signals or the processing or receive path for processing the GSM received signals in the WCDMA/GSM transceiver 500. In this regard, the WCDMA/GS M transceiver 500 may receive and/or may generate at least one signal to control the operation of the switches 504*a* and 504*b*.

The WCDMA/GSM transceiver 500 may also comprise duplexers 502*a* (B1) associated with band 1 and 502*bb* (B2) associated with band 2. The duplexers 502*a* and 502*b* may comprise suitable logic, circuitry, and/or code that enable combination of two or more signals onto a common channel or medium to increase its transmission efficiency. In this regard, the duplexers 502*a* and 502*b* may be the same or substantially similar to the duplexers 208*a* and 208*b* disclosed in FIG. 2.

Notwithstanding, the WCDMA/GSM transceiver 500 disclosed in FIG. 5 may also support transmission and/or reception of other wireless protocols such as GPRS and/or EDGE, for example, in the same manner or substantially the same manner as for GSM wireless protocol signals. Moreover, the WCDMA/GSM transceiver 500 may also support transmission and/or reception of other wireless protocols such as HSDPA and/or HSUDPA, for example, in the same manner or substantially the same manner as for WCDMA wireless protocol signals.

Figure 6:
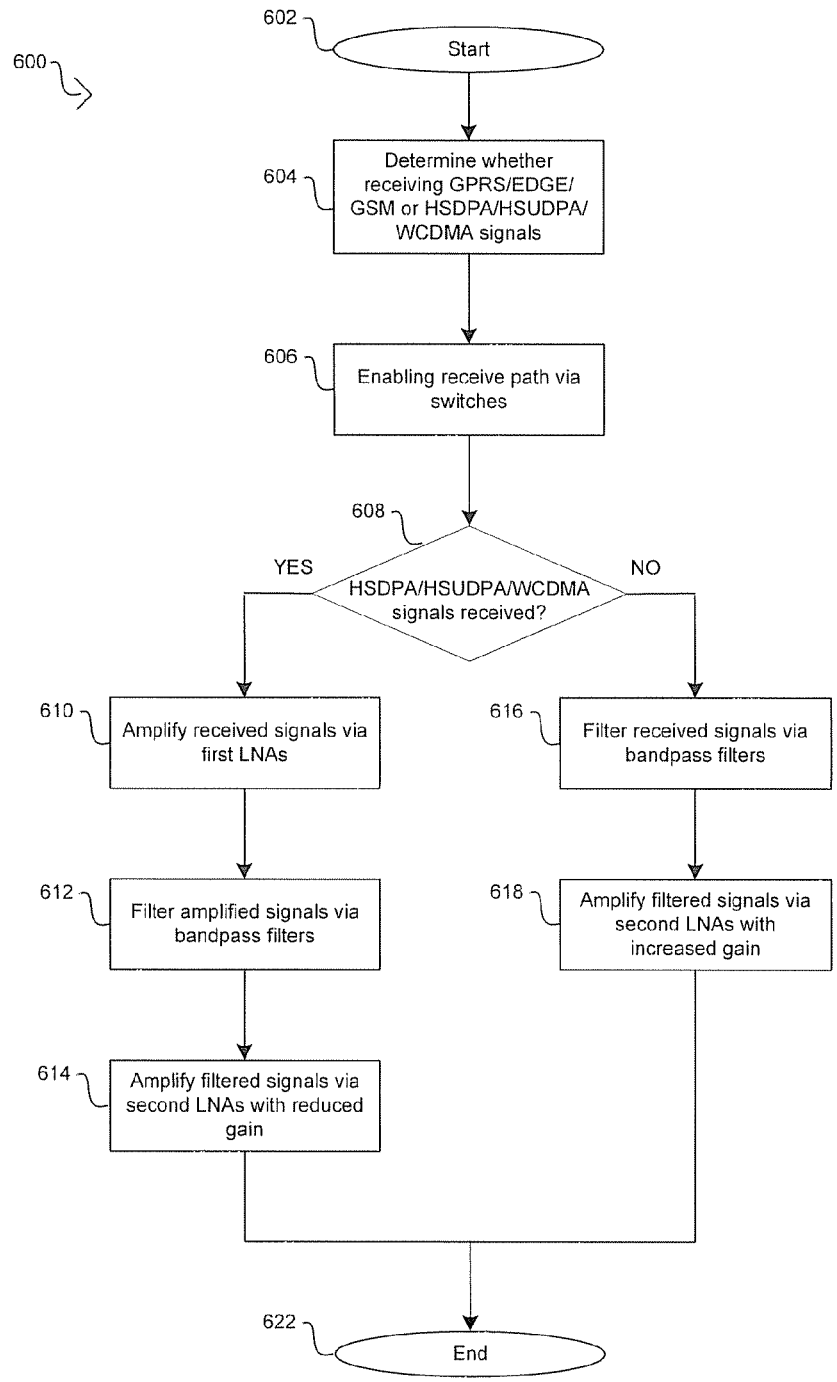
FIG. 6 is a flow diagram illustrating exemplary steps in the operation of the WCDMA/GSM transceiver in FIG. 5, in accordance with an embodiment of the invention.

FIG. 6 is a flow diagram illustrating exemplary steps in the operation of the WCDMA/GSM transceiver in FIG. 5, in accordance with an embodiment of the invention. Referring to FIG. 6, there is shown a flow diagram 600. In step 604, after start step 602, the wireless receiver 104 may determine whether it is receiving HSDPA, HSUDPA, and/or WCDMA signals or GPRS, EDGE, and/or GSM signals. In step 606, when GPRS, EDGE, and/or GSM signals are being received in step 604, the WCDMA/GSM transceiver 500 in FIG. 5 may generate at least one signal or may receive at least one signal to close the switches 504*a* and 504*b* to enable the GPRS, EDGE, and/or GSM signals received from the antennas 506*a* and 506*b* to be communicated to the LNAs 304*a* and 304*b* via the BFs 306*a* and 306*b*. Returning to step 606, when HSDPA, HSUDPA, and/or WCDMA signals are being received in step 604, the WCDMA/GSM transceiver 500 may generate at least one signal or may receive at least one signal to open the switches 504*a* and 504*b* to enable the HSDPA, HSUDPA, and/or WCDMA signals received from the antennas 506*a* and 506*b* via the duplexers 502*a* and 502*b* to be communicated to the LNAs 304*a* and 304*b* via the LNAs 206*a* and 206*b* and the BFs 306*a* and 306*b*.

In step 608, when HSDPA, HSUDPA, and/or WCDMA signals are received and the appropriate switch configuration has been enabled, the process may proceed to step 610. In step 610, the received HSDPA, HSUDPA, and/or WCDMA signals may be communicated from the duplexers 502*a* and 502*b* to the LNAs 206*a* and 206*b* for signal amplification. The LNAs 206*a* and 206*b* may be referred to as the first LNAs or first signal amplification stage in the HSDPA, HSUDPA, and/or WCDMA signals receive paths. In step 612, the amplified HSDPA, HSUDPA, and/or WCDMA signals may be communicated to the BFs 306*a* and 306*b* via the switches 504*a* and 504*b* for filtering. After filtering, in step 614, the filtered HSDPA, HSUDPA, and/or WCDMA signals may be communicated to the LNAs 304*a* and 304*b* for further signal amplification. The LNAs 304*a* and 304*b* may be referred to as the second LNAs or second signal amplification stage in the HSDPA, HSUDPA, and/or WCDMA signals receive paths Since HSDPA, HSUDPA, and/or WCDMA signals may be amplified by the first and second signal amplification stages and GPRS, EDGE, and/or GSM signal may be amplified by the second signal amplification stage that is shared between the receive paths, then the signal amplification gain provided by the LNAs 304*a* and 304*b* may be adjusted to compensate for the gain provided by the LNAs 206*a* and 206*b* for HSDPA, HSUDPA, and/or WCDMA signals. For example, the gain provided to received HSDPA, HSUDPA, and/or WCDMA signals by the LNAs 304*a* and 304*b* in the second amplification stage may be reduced from that which may be utilized for received GPRS, EDGE, and/or GSM signals to compensate for the gain that may be already provided by the LNAs 206*a* and 206*b*. In this regard, the WCDMA/GSM transceiver 500 may generate at least one signal or may receive at least one signal to adjust the gain of the LNAs 304a and 304b for HSDPA, HSUDPA, and/or WCDMA signals, for example. After the second amplification stage, the HSDPA, HSUDPA, and/or WCDMA signals may be communicated to another portion of the WCDMA/GSM transceiver 500 or to another portion of the wireless device 104 for further processing. After step 614, the process may proceed to end step 622.

Returning to step 608, when GPRS, EDGE, and/or GSM signals are received and the appropriate switch configuration has been enabled, the process may proceed to step 616. In step 616, the received GPRS, EDGE, and/or GSM signals may be communicated from the antennas 506a and 506b to the BFs 306a and 306b via the switches 504a and 504b for filtering. The BFs 306a and 306b may be shared between the receive paths. After filtering, in step 616, the filtered GPRS, EDGE, and/or GSM signals may be communicated to the LNAs 304a and 304b for further signal amplification. The LNAs 304a and 304b may be shared between the GPRS, EDGE, and/or GSM receive paths and the HSDPA, HSUDPA, and/or WCDMA receive paths and may correspond to the second LNAs or second signal amplification stage in the receive paths for HSDPA, HSUDPA, and/or WCDMA signals.

The gain provided to received GPRS, EDGE, and/or GSM signals by the LNAs 304a and 304b may be increased from that which may be utilized for received HSDPA, HSUDPA, and/or WCDMA signals since there is no gain provided to the GPRS, EDGE, and/or GSM signals by the LNAs 206a and 206b. In this regard, the WCDMA/GSM transceiver 500 may generate at least one signal or may receive at least one signal to adjust the gain of the LNAs 304a and 304b for received GPRS, EDGE, and/or GSM signals, for example. After the amplification stage provided by the LNAs 304a and 304b, the GPRS, EDGE, and/or GSM signals may be communicated to another portion of the WCDMA/GSM transceiver 500 or to another portion of the wireless device 104 for further processing. After step 618, the process may proceed to end step 622.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

Figure 7:
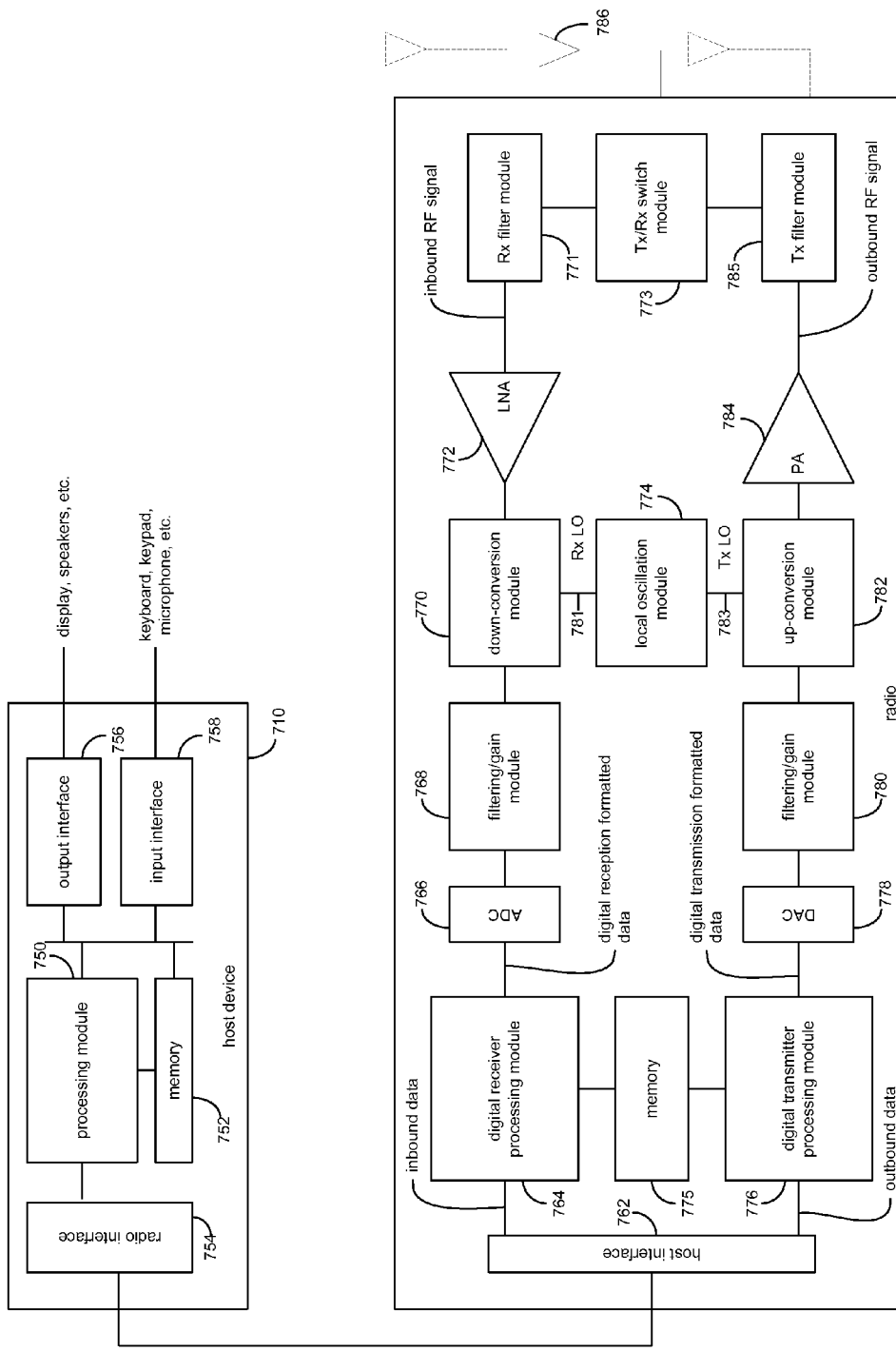
FIG. 7 is a block diagram illustrating a wireless communication host device and an associated radio, in accordance with an embodiment of the invention.

FIG. 7 is a block diagram illustrating a wireless communication host device and an associated radio, in accordance with an embodiment of the invention. Referring to FIG. 7, there is shown a wireless communication host device 710 and an associated radio 760.

The wireless communication host device 10 may comprise a processing module 750, a memory 752, a radio interface 754, an input interface 758 and an output interface 756. The processing module 750 and the memory 752 may be enabled to execute a plurality of instructions. For example, for a cellular telephone host device, the processing module 750 may be enabled to perform the corresponding communication functions in accordance with a particular cellular telephone standard.

The radio interface 754 may be enabled to allow data to be received from and transmitted to the radio 760. The radio interface 754 may be enabled to provide the data received from the radio 760 to the processing module 750 for further processing and/or routing to the output interface 756. The output interface 756 may be enabled to provide connectivity to an output device such as a display, monitor, or speakers such that the received data may be displayed. The radio interface 754 may be enabled to provide data from the processing module 750 to the radio 760. The processing module 750 may be enabled to receive the outbound data from an input device such as a keyboard, keypad, or microphone via the input interface 758 or generate the data itself. The processing module 750 may be enabled to perform a corresponding host function on the data received via input interface 758 and/or route it to radio 60 via radio interface 754.

For cellular telephone hosts, radio 760 may be a built-in component. For personal digital assistants hosts, laptop hosts, and/or personal computer hosts, the radio 760 may be built-in or an externally coupled component. The radio 760 may comprise a host interface 762, a digital receiver processing module 764, an analog-to-digital converter 766, a filtering/gain module 768, a down-conversion module 770, a low noise amplifier 772, a receiver filter module 771, a transmitter/receiver (Tx/Rx) switch module 773, a local oscillation module 774, a memory 775, a digital transmitter processing module 776, a digital-to-analog converter 778, a filtering/gain module 780, an up-conversion module 782, a power amplifier 784, a transmitter filter module 785, and an antenna 86 operatively coupled as shown. The antenna 786 may be shared by the transmit and receive paths as regulated by the Tx/Rx switch module 773.

The digital receiver processing module 764 and the digital transmitter processing module 776, in combination with operational instructions stored in the memory 775, may be enabled to execute digital receiver functions and digital transmitter functions, respectively. The digital receiver functions may comprise, but are not limited to, demodulation, constellation demapping, decoding, and/or descrambling. The digital transmitter functions may comprise, but are not limited to, scrambling, encoding, constellation mapping, and modulation. The digital receiver and the transmitter processing modules 764 and 776, respectively, may be implemented using a shared processing device, individual processing devices, or a plurality of processing devices, for example, a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The memory 775 may be a single memory device or a plurality of memory devices. For example, the memory 775 may be a read-only memory, random access memory, volatile memory, non-volatile memory, static memory, dynamic memory, flash memory, and/or any device that stores digital information. When the digital receiver processing module 764 and/or the digital transmitter processing module 776 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry. The memory 775 may be enabled to store, and digital receiver processing module 64 and/or digital transmitter processing module 776 may be enabled to execute, operational instructions corresponding to at least some of the functions illustrated herein.

In operation, the radio 760 may be enabled to receive outbound data from the wireless communication host device 10 via host interface 762. The host interface 762 may be enabled to route outbound data to the digital transmitter processing module 776. The digital transmitter processing module 776 may be enabled to process the outbound data in accordance with a particular wireless communication standard or protocol, for example, IEEE 802.11a, IEEE 802.11b, and Bluetooth to produce digital transmission formatted data. The digital transmission formatted data may be a digital baseband signal or a digital low IF signal, where the low IF may be in the frequency range of one hundred kilohertz to a few megahertz, for example.

The digital-to-analog converter 778 may be enabled to convert the digital transmission formatted data from the digital domain to the analog domain. The filtering/gain module 780 may be enabled to filter and/or adjusts the gain of the analog baseband signal prior to providing it to the up-conversion module 782. The up-conversion module 782 may be enabled to directly convert the analog baseband signal, or low IF signal, into an RF signal based on a transmitter local oscillation 83 provided by the local oscillation module 774. The power amplifier 784 may enable amplification of the RF signal to produce an outbound RF signal, which may be filtered by the transmitter filter module 785. The antenna 786 may be enabled to transmit the outbound RF signal to a targeted device such as a base station, an access point and/or another wireless communication device.

The radio 760 may be enabled to receive an inbound RF signal via antenna 786, which was transmitted by a base station, an access point, or another wireless communication device. The antenna 786 may be enabled to communicate the inbound RF signal to the receiver filter module 771 via Tx/Rx switch module 773, where Rx filter module 771 bandpass filters inbound RF signal. The Rx filter module 771 may be enabled to communicate the filtered RF signal to the low noise amplifier 772, which may amplify the inbound RF signal to generate an amplified inbound RF signal. The low noise amplifier 772 may be enabled to communicate the amplified inbound RF signal to the down-conversion module 770, which may directly convert the amplified inbound RF signal into an inbound low IF signal or baseband signal based on a receiver local oscillation 781 provided by local oscillation module 774. The down-conversion module 770 may be enabled to communicate the inbound low IF signal or baseband signal to the filtering/gain module 768. The filtering/gain module 768 may be enabled to filter and/or attenuate the inbound low IF signal or the inbound baseband signal to produce a filtered inbound signal.

The analog-to-digital converter 766 may be enabled to convert the filtered inbound signal from the analog domain to the digital domain to generate digital reception formatted data. The digital receiver processing module 764 may be enabled to decode, descramble, demap, and/or demodulate digital reception formatted data to recapture inbound data. The host interface 762 may be enabled to communicate the recaptured inbound data to the wireless communication host device 710 via the radio interface 754.

The local oscillation module 774 may be enabled to adjust an output frequency of a received local oscillation signal. The local oscillation module 774 may be enabled to receive a frequency correction input to adjust an output local oscillation signal to generate a frequency corrected local oscillation signal output.

What is claimed is:

1. A method for handling wireless signals, the method comprising:
   receiving a first wireless protocol signals and a second wireless protocol signals via a receiver in a wireless device; and
   selecting within said receiver one of: a first processing path for said received first wireless protocol signals and a second processing path for said received second wireless protocol signals, wherein:
   said first processing path comprises a duplexer downstream from an antenna, a first low noise amplifier downstream from said duplexer, a shared switch downstream from said first low noise amplifier and upstream from a first device that frequency converts said first wireless protocol signals, a shared bandpass filter downstream from said shared switch, and a shared low noise amplifier downstream from said shared bandpass filter; and
   said second processing path comprising said shared switch downstream from said antenna and upstream from a first device that frequency converts said second wireless protocol signals, said shared bandpass filter downstream from said shared switch, and said shared low noise amplifier downstream from said shared bandpass filter, wherein said selection is performed utilizing said shared switch.

2. The method according to claim 1, wherein said first wireless protocol signals is one of: HSDPA, HSUDPA, and WCDMA wireless protocol signals.

3. The method according to claim 1, wherein said second wireless protocol signals is one of: GPRS, EDGE, and GSM wireless protocol signals.

4. The method according to claim 1, comprising filtering said received first wireless protocol signals via said shared bandpass filter for said received first wireless protocol signals.

5. The method according to claim 4, comprising adjusting a gain in said shared low noise amplifier after said filtering, wherein said adjusting is based on a gain provided to said received first wireless protocol signals before said filtering.

6. The method according to claim 1, comprising filtering said received second wireless protocol signals via said shared bandpass filter for said received second wireless protocol signals.

7. The method according to claim 6, comprising adjusting a gain in said shared low noise amplifier after said filtering.

8. The method according to claim 1, comprising generating at least one signal for said selecting one of: said first processing path for said received first wireless protocol signals and said second processing path for said received second wireless protocol signals.

9. The method according to claim 1, comprising generating at least one signal for adjusting a gain in said selected processing path.

10. A non-transitory computer program product having stored thereon, a computer program having at least one code section for handling wireless signals, the at least one code section being executable by a machine for causing the machine to perform steps comprising:
   receiving a first wireless protocol signals and a second wireless protocol signals via a receiver in a wireless device; and
   selecting within said receiver one of: a first processing path for said received first wireless protocol signals and a second processing path for said received second wireless protocol signals, wherein:
      said first processing path comprises a duplexer downstream from an antenna, a first low noise amplifier downstream from said duplexer, a shared switch downstream from said first low noise amplifier and upstream from a first device that frequency converts said first wireless protocol signals, a shared bandpass filter downstream from said shared bandpass filter; and
      said second processing path comprises said shared switch downstream from said antenna and upstream from a first device that frequency converts said second wireless protocol signals, said shared bandpass filter downstream from said shared switch, and said shared low noise amplifier downstream from said shared bandpass filter, wherein said selection is performed utilizing shared switch.

11. The non-transitory computer program product according to claim 10, wherein said first wireless protocol signals is one of: HSDPA, HSUDPA, and WCDMA wireless protocol signals.

12. The non-transitory computer program product according to claim 10, wherein said second wireless protocol signals is one of: GARS, EDGE, and GSM wireless protocol signals.

13. The non-transitory computer program product according to claim 10, wherein said at least one code section comprises code for filtering said received first wireless protocol signals via said shared bandpass filtering for said received first wireless protocol signals.

14. The non-transitory computer program product according to claim 13, wherein said at least one code section comprises code for adjusting a gain in said shared low noise amplifier after said filtering, wherein said adjusting is based on a gain provided to said received first wireless protocol signals before said filtering.

15. The non-transitory computer program product according to claim 10, wherein said at least one code section comprises code for filtering said received second wireless protocol signals via said shared bandpass filter for said received second wireless protocol signals.

16. The non-transitory computer program product according to claim 15, wherein said at least one code section comprises code for adjusting a gain in said shared low noise amplifier after said filtering.

17. The non-transitory computer program product according to claim 10, wherein said at least one code section comprises code for generating at least one signal for said selecting one of: said first processing path for said received first wireless protocol signals and said second processing path for said received second wireless protocol signals.

18. The non-transitory computer program product according to claim 10, wherein said at least one code section comprises code for generating at least one signal for said adjusting a gain in said selected processing path.

19. A system for handling wireless signals, the system comprising:
   a receiver in a wireless device that enables receiving a first wireless protocol signals and a second wireless protocol signals; and
   said receiver enables selecting one of: a first processing path within said receiver for said received first wireless protocol signals and a second processing path within said receiver for said received second wireless protocol signals; wherein:
      said first processing path comprises a duplexer downstream from an antenna, a first low noise amplifier downstream from said duplexer, a shared switch downstream from said first low noise amplifier and upstream from a first device that frequency converts said first wireless protocol signals, a shared bandpass filter downstream from said shared switch, and a shared low noise amplifier downstream from said shared bandpass filter; and
      said second processing path comprises said shared switch downstream from said antenna and upstream from a first device that frequency converts said second wireless protocol signals, said shared bandpass filter downstream from said shared switch, and said shared low noise amplifier downstream from said shared bandpass filter, wherein said selection is performed utilizing said shared switch.

20. The system according to claim 19, wherein said first wireless protocol signals is one of: HSDPA, HSUDPA, and WCDMA wireless protocol signals.

21. The system according to claim 19, wherein said second wireless protocol signals is one of: GPRS, EDGE, and GSM wireless protocol signals.

22. The system according to claim 19, wherein said receiver is operable to filter said received first wireless protocol signals via said shared bandpass filter for said received first wireless protocol signals.

23. The system according to claim 22, wherein said receiver is operable to adjust a gain in said shared low noise amplifier after said filtering, wherein said adjusting is based on a gain provided to said received first wireless protocol signals before said filtering.

24. The system according to claim 19, wherein said receiver is operable to filter said received second wireless protocol signals via said shared bandpass filter for said received second wireless protocol signals.

25. The system according to claim 24, wherein said receiver is operable to adjust a gain in said shared low noise amplifier after said filtering.

26. The system according to claim 19, wherein said receiver is operable to generate at least one signal for said selecting one of: said first processing path for said received first wireless protocol signals and said second processing path for said received second wireless protocol signals.

27. The system according to claim 19, wherein said receiver is operable to generate at least one signal for said adjusting a gain in said selected processing path.

28. A method for handling multiple protocol signals in a wireless terminal, the method comprising:
   processing received wideband signals and time division multiplexed signals via:
      a first processing path that comprises a duplexer downstream from an antenna, a first low noise amplifier downstream from said duplexer, a shared switch downstream from said first low noise amplifier and upstream from a first device that frequency converts said wideband signals, a shared bandpass filter downstream from said shared switch, and a shared low noise amplifier downstream from said shared bandpass filter; and a second processing path that comprises said shared switch downstream from said antenna and upstream from a first device that frequency converts said time division multiplexed signals, said shared bandpass filter downstream from said shared switch, and said shared low noise amplifier downstream from said shared bandpass filter, wherein said shared switch is utilized for selection of one of said first processing path and said second processing path.

29. The method according to claim 28, wherein said wideband signal comprises WCDMA signals.

30. The method according to claim 28, wherein said time division multiplexed signals comprises at least one of: GSM, GPRS and EDGE signals.

* * * * *